Jan. 30, 1968 F. W. VIEHE 3,366,940

MEMORY STRUCTURE HAVING CORES COMPRISING MAGNETIC PARTICLES SUSPENDED IN A DIELECTRIC MEDIUM

Original Filed Jan. 30, 1962 4 Sheets-Sheet 1

INVENTOR.
FREDERICK W. VIEHE, deceased
SARA CATHERINE VIEHE
administratrix
BY Fulwider, Mattingly & Huntley
ATTORNEYS Jan. 30, 1968 F. W. VIEHE 3,366,940

MEMORY STRUCTURE HAVING CORES COMPRISING MAGNETIC PARTICLES SUSPENDED IN A DIELECTRIC MEDIUM

Original Filed Jan. 30, 1962 4 Sheets-Sheet 2

INVENTOR.
FREDERICK W. VIEHE, deceased
SARA CATHERINE VIEHE
admistratrix,
BY Fulwider Mattingly & Huntley
ATTORNEYS INVENTOR.
FREDERICK W. VIEHE, deceased
SARA CATHERINE VIEHE
administratrix
BY Fulwider Mattingly & Huntley
ATTORNEYS INVENTOR.
FREDERICK W. VIEHE, deceased
SARA CATHERINE VIEHE
administratrix
BY Fulwider Mattingly & Huntley
ATTORNEYS 3,366,940

MEMORY STRUCTURE HAVING CORES COMPRISING MAGNETIC PARTICLES SUSPENDED IN A DIELECTRIC MEDIUM

Frederick W. Viehe, deceased, late of Los Angeles, Calif., by Sara Catherine Viehe, administratrix, Los Angeles, Calif.; J. Gregg Evans, executor of said Sara Catherine Viehe, deceased, and administrator of the estate of said Frederick W. Viehe, deceased, assignor to Frederick W. Viehe, Jr., Los Angeles, Calif.

Original application Jan. 30, 1962, Ser. No. 169,973, now Patent No. 3,264,713, dated Aug. 9, 1966. Divided and this application Jan. 7, 1966, Ser. No. 539,593
5 Claims. (Cl. 340—174)

ABSTRACT OF THE DISCLOSURE

Information storage apparatus including an array of intersecting electrical conductors having magnetic cores located at selected conductor intersections. The conductor array and cores may be potted in a heat-softenable dielectric medium and the cores are reformable about selected conductor intersections by programmed electrical current flow through the conductors.

This is a division of application Ser. No. 169,973, filed Jan. 30, 1962 now Patent No. 3,264,713.

This invention relates to magnetic memory devices, and more particularly to a new and improved memory core structure and method of making the same, wherein the memory cores are automatically and selectively formed directly at desired sites within a matrix.

In the field of electronic information storage systems, it has been a common practice to employ miniature magnetic cores, having rectangular hysteresis characteristics, for memory purposes. By virtue of the extremely small size of such cores, thousands of "bits" of information may be stored within a few cubic feet of space.

The quality of performance of a memory core is, in large part, determined by the squareness of its hysteresis loop which in turn is determined by the specific magnetic material utilized in manufacturing the memory core. High remanence materials, such as manganese-magnesium ferrite or the like, are frequently utilized for such purposes. These high remanence materials impart to the memory core its bistable property, namely the capability of being switched from one of two stable remanent (or memory) states to the other by means of magnetomotive forces that exceed the minimum "coercive force" level for the core. This bistable state enables a single bit of information to be stored in each memory core as a selected one of its two remanent states.

In modern magnetic memory systems, a plurality of magnetic memory cores, usually toroidal in shape, are commonly arranged in either two-dimensional or three-dimensional storage arrays. Two dimensional arrays conventionally comprise a rectangular single-plane matrix of memory cores arranged in rows and columns, with either single-turn windings about the cores, or straight wires passing through the cores, in each individual row and each individual column. Selection of a particular core in the plane is by coincident energization of single column and single row windings intersecting at the site of the selected core.

In order to "write" into a particular core without affecting other cores, currents, typically in the form of coincident pulses, are supplied to the row and column windings for the selected core, the magnitude of each current being sufficient to provide little more than half of the coercive magnetomotive force necessary to switch the core from one to the other of its two memory states. Accordingly, the only core at the intersection of the selected row and column being pulsed receives a sufficient magnetomotive driving force for this purpose.

Thus, each of the cores in the same excited row or column as the selected core receives less than the critical value of magnetomotive coercive force and, therefore, its memory state remains the same. In this manner, by selective excitation, any chosen core can be switched from one memory state to the other without affecting the memory states of any other cores in the same system. Essentially, therefore, such a system is random access in character.

To accomplish "reading" of a magnetic memory core matrix, a magnetomotive force of the requisite coercive level and standardized polarity is applied to the selected core, in a manner similar to that by which information is written into the core. Accordingly, if the core being read is already in the memory state to which it would normally be driven by the reading magnetomotive force, no change in memory state occurs, and no output is obtained.

However, if the core being read is initially in the opposite memory state, it is switched to its other memory state, and an output signal is induced in a suitable reading coil. In this regard, any winding on the selected core, which is not being used to supply reading current pulses, may be utilized to "sense" whether or not there has been a change in the memory state of that core.

The above description for a two-dimensional memory core array is readily extended to three-dimensional matrices or arrays. In the latter system, each memory core has at least three coordinate windings, such as X, Y, Z. To write into a selected core, little more than one-third of the necessary coercive magnetomotive force need be applied to each of the X, Y, and Z conductor lines intersecting at the selected core site. Alternatively, a lesser number of lines, such as X and Y alone, might be utilized to write into a selected core in the same manner as is usually done for systems utilizing two-dimensional arrays. In reading cores in the three-dimensional matrix, one of the lines may be utilized as a "sense" winding, while one or more of the other lines may be utilized to supply the reading pulses.

In a typical memory core production operation, ferrite material is first molded into individual small toroid shaped cores. Thereafter, each core is heat treated and subsequently tested to determine the acceptability of its electromagnetic properties. The acceptable cores, commonly of the order of 1–1½ millimeters in outside diameter, are subsequently arranged in flat arrays of desired orientations and wires are threaded through them. Typical arrays contain in excess of one thousand cores and require a minimum of forty man-hours for assembly. The array is then again tested and all unacceptable cores are removed and replaced. The tested arrays may be subsequently arranged in banks and, after further wiring and assembly, are ready for use in information storage systems.

Heretofore, memory core arrays of the type described have had to be assembled largely by hand, the windings being threaded through each of the individual cores and providing support therefor in the completed matrix. This means of assembly has become increasingly time consuming and expensive, particularly in view of requirements for arrays of greater capacity and a larger number of cores, and the trend towards greater miniaturization of cores. The problem of individual handling of these cores for testing, for manually threading windings through the center openings of the cores, besides being tedious and difficult, makes the construction of such large capacity arrays extremely expensive.

The latter situation poses some of the most critical problems confronting designers of modern information storage systems. In this regard, those concerned with the development of such storage devices have long recognized the need for a memory core array of increased capacity and reasonably small size, and which could be made with a minimum of time-consuming manual labor.

Accordingly, it is an object of the present invention to provide a new and improved memory core structure and method of making such a structure that overcomes the above and other disadvantages of the prior art.

Another object is to provide a memory core system with greater information handling capacity in a given space than is possible with prior art memory core systems.

A further object of the instant invention is the provision of a magnetic matrix memory which eliminates the need for manual assembly of individual memory cores.

A still further object of the invention is the provision of a novel method of fabricating memory cores within a matrix whereby memory cores may be formed at selected sites individually, in groups, or at all sites simultaneously.

Another object is to provide a new and improved method for forming memory cores directly at their intended sites within a memory system and which simultaneously provides an expedient for potting the resultant system produced thereby.

A still further object of the present invention is to provide a memory core structure which is capable of subsequent reforming within the system in which it is embodied.

The above and other objects and advantages of this invention will be better understood by reference to the following detailed description when considered in connection with the accompanying drawings wherein.

Figure 13:
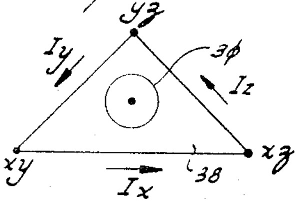
Figure 14:
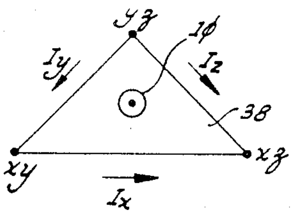
Figure 12:
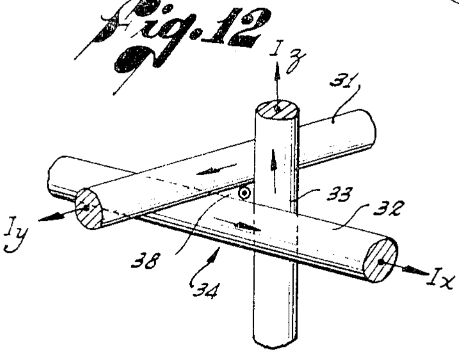
FIGURE 12 is a perspective view of a three-conductor intersection in the matrix of FIGURE 10, to better illustrate the nature of the 3-point tangency of the conductors.
Figure 15:
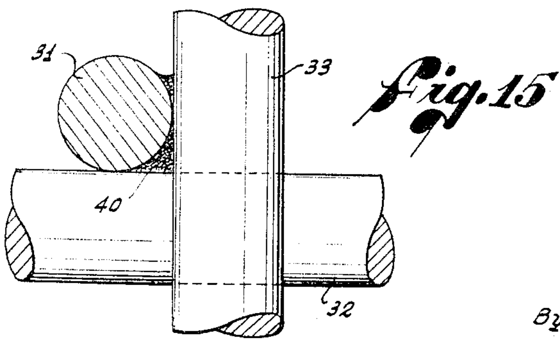

FIGURES 13 and 14 are schematic illustrations of the three-point intersection shown in FIGURE 12, depicting the direction and magnitude of net magnetic flux intensity for different current directions through the conductors; and FIGURE 15 illustrates a typical three-conductor intersection which has been treated, in accordance with the instant invention, to improve the quality of the memory core formed at that intersection.

Briefly, the present invention contemplates the arrangement of a plurality of intersecting conductors in a multidimensional matrix or array and the subsequent direct formation of magnetic cores of finely divided particles of magnetic material at one or more selected conductor intersections within the matrix. The latter is accomplished by means of a novel electrical current forming technique which simultaneously and automatically combines the core formation and core placement processes.

The word "core" as used herein means any configuration that may be assumed by the magnetic particles to form a closed magnetic path.

The magnetic cores may be selectively and automatically formed at any one or more of the sites within the conductor matrix, and this process may be accomplished for each core side individually, in groups, or for all of the core sites simultaneously. The latter results in an obvious economy since manual assembly of memory cores in the matrix by skilled labor is not required.

Moreover, the magnetic memory cores of the instant invention may be fabricated in sizes which are considerably smaller than the minimal practical memory core dimensions heretofore attainable by the prior art. In this regard, the smaller core size facilitated by the present invention enables much closer spacing of adjacent conductors in the matrix, as well as provision of a much greater number of cores per unit of volume available in modern data storage mediums. Thus, the memory core structure of the instant invention facilitates a considerable reduction in size for memory core systems of the same information storage capacity as those heretofore available by prior art techniques, as well as enabling greatly increased capacity for memory core systems of the same size as those heretofore produced by prior art techniques.

Basically, the present invention involves the selective deposition of finely divided particles of magnetic material at chosen core sites by means of magnetic field attraction of this magnetic material to the core sites. This is accomplished by controlled programming of electrical currents passing through the conductors of the matrix which intersect at the selected core sites. In this regard, the magnetic material used in forming memory cores at desired locations is held in suspension within a suitable fluid vehicle. Electrical currents are subsequently programmed through the conductors of the matrix, in accordance with a primary aspect of the present invention, to selectively form magnetic core structures at the desired intersections.

Upon completion of the core formation sequence, the fluid vehicle is solidified to preserve the core-like structures. Moreover, it is also contemplated, in several embodiments of the invention, that the electrical currents utilized in forming magnetic memory cores at selected core sites may also be subsequently programmed to facilitate a solidification of the fluid vehicle in which the magnetic core forming material is suspended. In this regard, the invention may be practiced with thermosetting as well as thermoplastic mediums and, hence, a wide variety of both rugged and inexpensive materials may be utilized in the core forming techniques of the present invention.

The instant invention further contemplates, in one embodiment thereof, the provision of a completed magnetic memory core device wherein the solidified fluid vehicle may subsequently, by electrical currents, be re-fluidized to enable re-forming of the memory cores in new orientations with respect to their core sites. The latter capability enhances the versatility and adaptability of such memory core systems for specialized purposes.

Figures 1, 2:
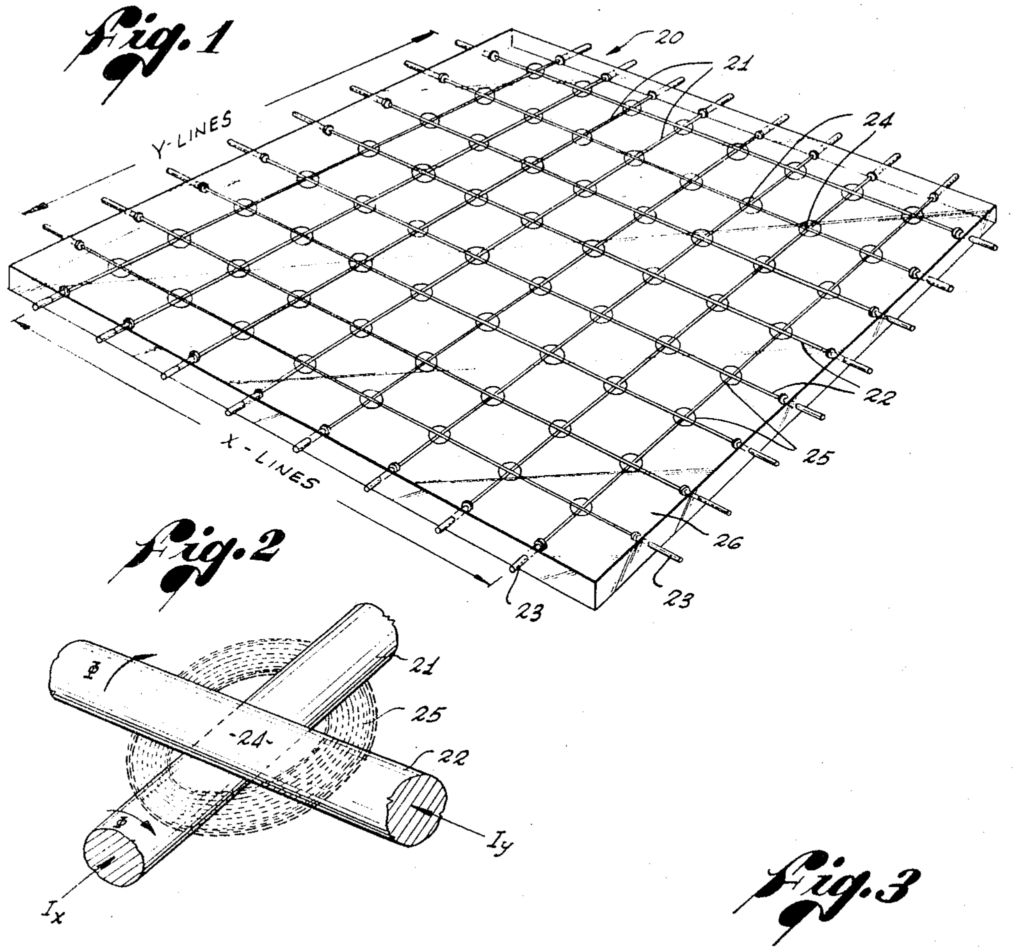
FIGURE 1 is a perspective view of a two-dimensional memory core matrix made in accordance with the instant invention.
FIGURE 2 is a perspective view of a typical conductor intersection within the matrix shown in FIGURE 1 and illustrates the magnetic flux directions and core orientation for certain directions of electrical currents through the conductors.

Referring now to the drawings, wherein like reference characters designate like parts throughout, there is shown in FIGURE 1 a completed two-dimensional magnetic memory core matrix 20, formed in accordance with the instant invention. The matrix 20 is shown to be a latticework formed of groups of a plurality of spaced, parallel, coplanar insulated conductors 21, 22, crossing at right angles to each other, the groups of conductors being designated as X-lines and Y-lines, respectively. The ends of the X- and Y-lines terminate in electrically conductive contact pins 23.

Each of the conductor intersections 24 in the matrix 20 is a site for a magnetic memory core structure 25, fabricated and oriented in accordance with the instant invention. The entire system, comprising the X-lines 21, Y-lines 22 and memory cores 25, is shown in FIGURE 1 in its final state embedded in a block 26 of a suitable dielectric or insulating material.

In the unique method of making the magnetic memory core matrix 20 in accordance with the present invention, the X-line conductors 21 and Y-line conductors 22 are first arranged to form the lattice, as by weaving, or any appropriate jigging ararngements and assembly techniques well known in the art. The conductors 21 and 22 may be insulated or non-insulated conductors. If they are not insulated, they may first be assembled in the lattice, and then coated with a suitable insulating material.

If the conductors are initially insulated, they are secured at each of their intersections 24 by means of a suitable insulating adhesive, which may be applied by any well known process, e.g., dipping, spraying, or the like. In this regard, the viscosity of the adhesive may be selectively adjusted to enable surface tension isolation phenomena to concentrate the adhesive at the X- and Y-line intersections 24. However, no deleterious effects are encountered if the adhesive covers the matrix conductors 21, 22 in their entirety, rather than being confined solely to the conductor intersections 24.

A primary aspect of the present invention involves the manipulation of the assembled intersecting conductors 21, 22 to enable the memory cores 25 to be selectively and automatically formed in any desired orientations about the core sites 24. Basically, this is done by suspending finely divided magnetic material in a fluid vehicle adjacent the core sites 24 and subsequently establishing a magnetic field at the desired core sites to attract the magnetic particles and form the desired memory cores 25.

The formation of the memory cores 25 is subsequently followed by a solidification or potting process to insure proper dielectric characteristics and ruggedness for the completed memory core matrix 20 and to maintain the final alignment of the particles of magnetic material that form the cores. This potting process may include separately potting the matrix subsequent to core formation, or treating the fluid vehicle in which the magnetic material was suspended, to solidify it and form the block 26.

It will be noted from FIGURE 1 that the X- and Y-lines 21, 22 are shown to be mutually perpendicular. Although the present invention is not limited to such an arrangement, it is the one most commonly encountered in practice, and hence will be utilized as an appropriate example for purposes of explaining the invention. In accordance with the invention, electrical currents are programmed through the X- and Y-lines 21, 22 to set up magnetic fields which attract magnetic particles to the intersections 24 to form cores 25.

Formation of the cores 25 of course requires mutual inductance, i.e., in-phase magnetic flux common to the magnetic fields set up about both conductors at each intersection so that the magnetic vectors about each of the conductors are additive. Normally, the mutually perpendicular X- and Y-lines 21 and 22 would not be expected to have mutual inductance. However, with the conductors immersed in a fluid vehicle carrying magnetic particles in suspension, the usual rule for mutual inductance of conductors in air or a vacuum does not apply. In essence, the magnetic fields established by currents passing through the conductors of the matrix cause the magnetic material in suspension to be attracted to the intersections 24. Therefore, the exception to the general rule of non-mutually inductive wires in quadrature resides in the mobility of the magnetic material in suspension which tends to align itself so as to couple the magnetic fields about each of the intersecting conductors and thereby preserve the mutual inductance between these conductors.

In forming cores as above described, such factors as the viscosity of the fluid medium, the magnetic permeability of the suspended magnetic material, and the particle size of the magnetic material, determine the minimum current below which no magnetic core structure can form. In this regard, the point at which a magnetic core will begin to form is directly proportional to the magnitude of the electrical current and very nearly inversely proportional to the diameter of the conductor. The latter theorem is fully harnessed in practicing the core forming techniques of the instant invention.

Figure 3:
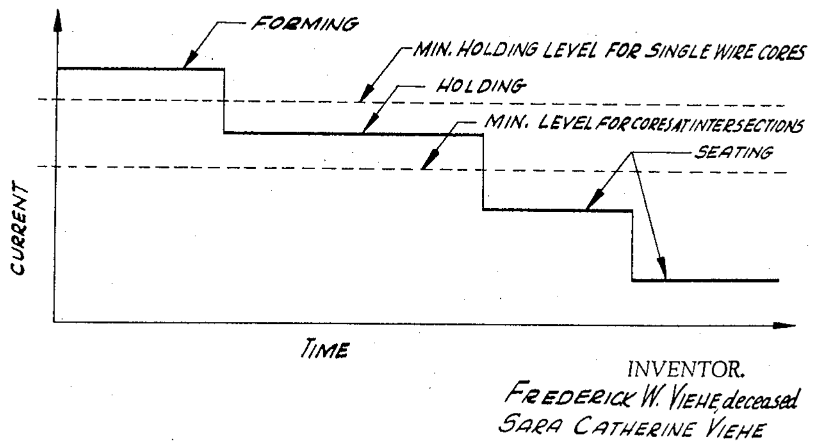
FIGURE 3 is a graph of current variations with time to illustrate one manner in which direct currents are programmed through the conductor matrix of FIGURE 1 to form memory core structures at the selected core sites.

Because of the magnetic field set up around each of the conductors 21, 22 due to currents flowing therethrough, the magnetic particles in the fluid vehicle tend to align themselves around these conductors. The strength of the magnetic field set up by the electrical currents flowing through the X- and Y-lines is adjusted to be sufficient to overcome the effects of gravity, i.e., the tendency of the magnetic particles to precipitate or settle out. As illustrated in FIGURE 3, the forming current is maintained for a period of time necessary to cause the cores to form at the intersections. During this period, of course, particles are also attracted to the wires throughout the matrix.

Once the magnetic material has oriented itself about the wires of the matrix, the magnitude of the electrical current is reduced to a considerably lower "hold" current level. The magnitude of this hold current is such that the magnetic particles along the conductors between the intersections no longer remain in position due to the weakened magnetic field and, therefore, these magnetic particles fall away from the matrix conductors under the influence of gravity. However, at each intersection 24, the vector sum of the magnetic field strength about each of the individual conductors is still sufficient to hold the magnetic material at the intersection without precipitation.

The magnitude of the hold current thus serves as a useful expedient for causing preferential core formation only at the intersection points of various conductors in the matrix, as opposed to core formations which girdle individual conductors along their lengths. Depending upon the specific nature of the fluid vehicle in which the magnetic material is initially suspended, the fluid vehicle may be suitable treated to pot the entire memory core matrix, following core formation, or a separate medium may be subsequently added for potting purposes.

Referring to FIGURE 2, which illustrates a typical intersection 24 of X- and Y-lines 21, 22, currents $I_{x2}$, $I_y$ are shown to be passing through the lines in a direction away from the viewer, thereby to set up clockwise magnetic fields $\phi$ about these conductors. The directions of these magnetic fields are such as to cause magnetic particles to form a continuous core 25 that passes above the conductors on one side of the intersection (the side nearer the viewer) and under the conductors on the opposite side of the intersection.

The specific manner in which the core 25 links the conductors is readily controlled through the choice of directions assigned to the electrical currents passing through X- and Y-lines 21, 22. In this regard, the core 25 will form in an orientation such that the currents passing through the conductors 21, 22 at the intersection 24 will pierce the plane of the core from the same side. Herein resides another important aspect of the present invention, viz, each of the cores 25 in the final matrix 20 may be given any desired orientation with respect to its core site 24 by simply controlling the direction of the currents passing through the matrix, at the selected conductor intersection, during the core formation process.

It should be noted that the toroidal form of the core shown in FIGURE 2 is illustrative only. In actual practice, the particles align themselves to form a core that generally follows the outer contours, or outlines, of the intersecting conductors. Such a core may vary markedly from one having axial symmetry and a uniform cross section, nevertheless, it is a bistable memory element operable in the same manner as conventional memory cores.

The magnetic material utilized in the core forming techniques of the present invention may be any suitable ferromagnetic or ferrimagnetic material having rectangular hysteresis characteristics, such as manganese-magnesium ferrite or the like. The magnetic material should be in ultrafine powdered form for subsequent suspension, preferably in domain-size particles.

The vehicle 26, in which the particles of magnetic material are suspended, is a suitable dielectric medium which can be maintained in a fluid state during the core formation process and can subsequently be cured or set to preserve the orientation of the magnetic particles. The latter insures the permanency of the core structures. Both polymerized or unpolymerized liquid plastics, either thermoplastic or thermosetting in character, have been found to have satisfactory application in practicing the invention. In this regard, the present state of the art is such that an extremely wide variety of materials may be utilized including polyolefin, polyester, polyether and polyvinyl resins, as well as a great variety of waxes, such as beeswax and rosin, paraffin or the like. In using such materials, appropriate catalytic and polymerizing agents, such as a suitable peroxide or the like, may be utilized in techniques well known in the art to regulate the characteristics of the foregoing materials so as to impart qualities most desirable in accordance with the process to be practiced upon them. In this regard, the specific proportions of magnetic material and dielectric medium will depend upon the particular materials ultimately selected.

Depending upon the specific materials chosen, the cores may be formed in a variety of ways. In one example, the cores are formed by "post-forming" with suitable heat-softenable materials, such as thermoplastics, waxes or the like. In this process, the assembled matrix is immersed in the suspension of magnetic material within the selected dielectric medium. Thereafter, the dielectric medium is permitted to take a set, the precipitation or settling out of the magnetic material being prevented by suitable well known techniques, e.g., agitation.

Following the solidification of the dielectric medium, combined melt and "forming" currents (see FIGURE 3) are passed through the X- and Y-lines to melt the dielectric medium immediately adjacent the surfaces of the various conductors, thereby enabling freedom of motion for the magnetic particles suspended in the dielectric medium immediately adjacent the conductors.

The effect of the forming currents is to produce core formations at the intersections 24 and also along the individual conductors 21, 22. However, referring to FIGURE 3, subsequent current programming eliminates the cores along the conductors. This is accomplished by reducing the forming current to a level whereby the strength of the magnetic field surrounding the individual conductors 21, 22 in the matrix is insufficient to support the core structures along individual conductors against the influence of Stokes Law forces which tends to break up these cores. Again, due to the increased magnetic field strength existing at the intersections 24, a much lower level of electrical current is required to sustain core structures 25 at these sites. Therefore, as indicated in FIGURE 3, a "holding" current level is selected which is insufficient to sustain single conductor girdle paths, but yet is sufficient to sustain the core structures 25 at the selected matrix intersections 24.

The duration of the holding current level is determined by the rapidity with which the single conductor girdles break up and fall away. The magnitude of the holding currents is thereafter successively reduced to a plurality of "seating" current levels. The magnitude of the seating current is chosen such that continued current at these lower levels allow the fluid dielectric vehicle to take a permanent set and thereby preserve the core structures 25 formed at the intersections.

The nomer "post-forming" is applied to the above-described core formation technique in view of the fact that the core forming process is carried out after the dielectric vehicle in which the magnetic material is suspended has first been solidified and subsequently re-melted only adjacent the conductors of the matrix. In this regard, the particles of magnetic material which are not utilized in forming cores 25 at the matrix intersections 24 remain dispersed throughout the dielectric medium after it has taken a permanent set. However, the concentration of magnetic material about the core sites 24 is substantially unaffected in its magnetic properties by the presence of additional magnetic material remaining dispersed throughout the dielectric medium.

The latter condition does, of course, affect the ultimate conductivity of the completed matrix 20 and, accordingly, such considerations might influence the desirability of the post-forming technique. However, if desired, the magnitude of the forming current can be such as to melt all of the dielectric medium, rather than merely those portions immediately adjacent the conductors of the matrix. In the latter instance, excess magnetic material would settle out, in accordance with Stokes Law, during the holding current phase and would have no significant effect upon the ultimate conductivity of the completed memory system.

Figures 4, 5, 6:
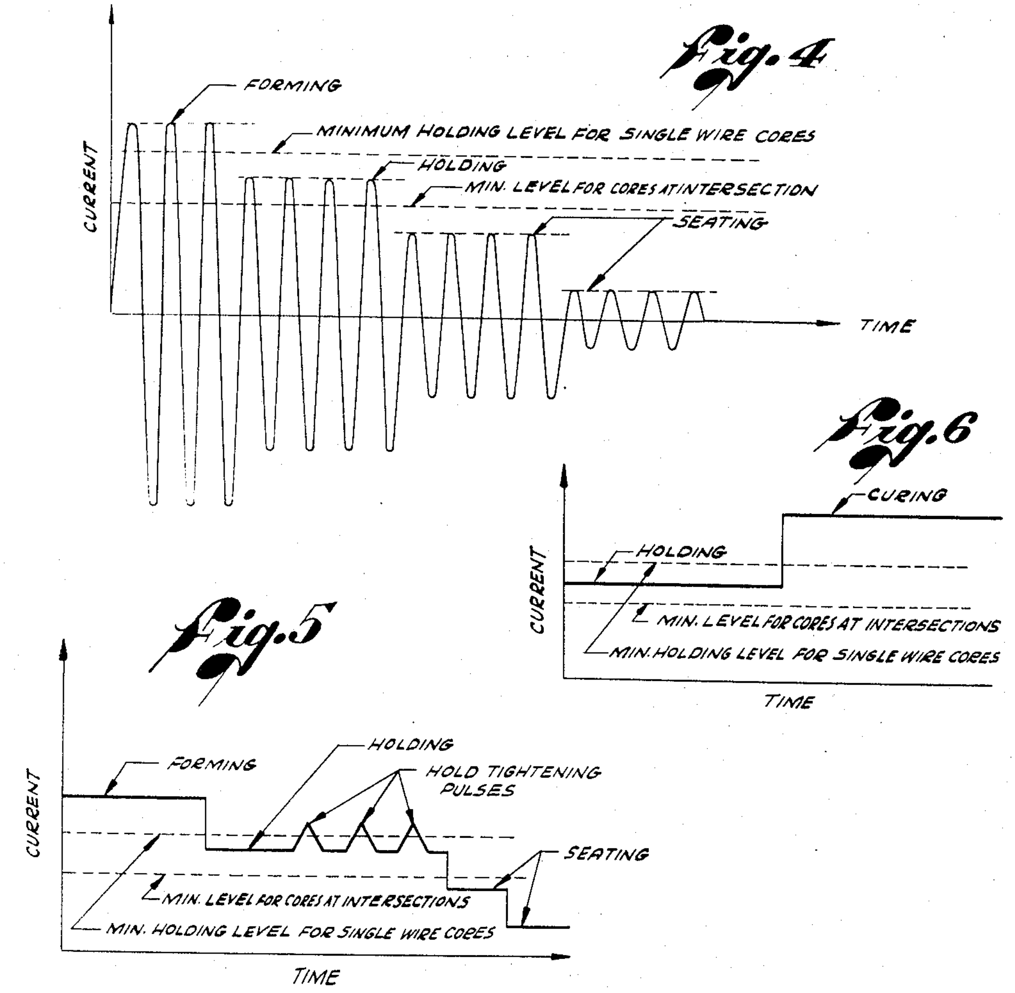
FIGURE 4 is a graph of current variations with time to illustrate one manner in which alternating currents are utilized to produce memory core structures in accordance nique of this invention.
FIGURE 5 is a graph of current variations with time to illustrate another direct current programming technique of this invention.
FIGURE 6 is a graph of current variations with time to illustrate still another direct current programming technique embraced by this invention.

Referring to FIGURE 4, the invention may be practiced with alternating currents, as well as with the direct currents depicted in FIGURE 3. Programming of the alternating currents is done in substantially the same manner as for the direct current case. Moreover, the use of alternating current appears to have the desirable effect of breaking up any eddy current paths in the core structures as they are formed. The frequency and magnitude of the alternating currents is chosen in accordance with the specific magnetic material in suspension. However, in utilizing alternating currents to form the memory cores 25, care must be taken to avoid resonance phenomena which can cause turbulence and may disrupt the orientation and seating of the cores. In this regard, however, resonance phenomena would usually be encountered only at high frequencies which are well above those utilized to comb out the eddy current paths.

A further embodiment of the method of forming cores as contemplated by the invention is illustrated in FIGURE 5. This process is similar to that shown in FIGURE 3, the primary variation being the nature of the holding level phase. As indicated in FIGURE 5, the steps are the same through the application of holding level current of sufficient duration to allow for settling out of particles girdling the conductors between the intersections. Then a plurality of intense holding pulses, of very short duration, are applied in the same direction as the holding current. These pulses have the effect of minimizing nonmagnetic gap spaces between adjacent magnetic particles forming the core 25 and, thereby produce a tighter, more dense core structure.

Although the magnitude of the hold pulses in FIGURE 5 is such that core structures girdling individual conductors could conceivably be re-formed, the duration of the individual pulses is chosen, in accordance with the transient response of the magnetic particles in the dielectric medium, to prevent this from occurring. The duration of the holding pulses is also such as to prevent remelting of the dielectric medium during the holding current phase. In regard to the production of tighter, more dense core structures, it should be pointed out that many fluid dielectric mediums contract upon solidification and that this further contributes to a decrease in high reluctance gaps between adjacent magnetic particles forming the memory cores.

As will be apparent from the foregoing, the "concurrent" and post-forming techniques of forming memory cores are basically the same, the only difference being that in the latter case, melting current is first required to fluidize the dielectric vehicle in which the magnetic particles are suspended.

The preference for either post-forming or concurrent forming techniques depends largely upon the size of the magnetic particles in suspension, as well as the physical characteristics of the dielectric medium in which it is suspended. If the magnetic particles are large or heavy, and the liquid phase of the dielectric medium is long in duration, as well as low in viscosity, Stokes Law considerations may dictate that concurrent forming is to be preferred. The reason for such a choice would be that solidification of the dielectric medium for subsequent post-forming techniques requires homogeneity of suspension and there would be a great likelihood, under the conditions specified, of excess settling of the magnetic material during the solidification process. In concurrent forming, on the other hand, the core formations are preserved intact at the time the dielectric medium takes a permanent set. Where thermosetting materials are employed, the thermosetting material may be cured to a solid state, following precipitation of excess magnetic material during the holding current phase, by increasing the electrical currents through the matrix conductors from a holding level to a curing level, as indicated in FIGURE 6. Of course, curing may be accomplished by other thermal techniques, such as oven heating. Moreover, the use of a high current level curing phase, or a repetition of forming and holding current levels prior to the curing level phase or prior to oven heating, serves to further condition the memory core structures. In this regard, there is no fear of re-forming the girdles about single conductors or of overloading the core sites, since excess magnetic material has already been settled out and only the magnetic particles already at the core sites remain.

The method of this invention also embraces "liquid bead forming." This involves a bead solution of magnetic material suspended within a suitable dielectric medium and applied to the matrix by any suitable process, such as spraying, dipping, pouring or the like. In this connection, the dielectric medium should possess surface tension characteristics which enable capillary attraction to draw the bead solution to the matrix intersections 24. The high surface tension phenomena thereby prevents the fluid vehicle from wetting the conductors except at the core sites and, thus, facilitates the formation of beads at core sites only.

It is desirable to withhold the application of electrical currents from the conductors of the matrix until the beads have completely formed at the core sites 24. To help keep the beads round and encircling the core sites, the matrix assembly may be tumbled or rolled. Before the beads solidify entirely, the forming, holding and seating currents are applied in any of the ways previously described.

When solidification of the beads is complete, a holding current level is maintained, and the entire assembly is immersed in a compatible potting medium for protection, rigidity, insulation, etc. In this regard, the potting medium must have characteristics such that it will not sweep away the formed cores and solidified beads when the potting medium is added. In some instances, it may be desirable to delay the use of forming, holding and seating currents until the entire assembly has been potted. In the latter case, the core forming technique is basically that of the post-forming method previously described.

One of the features contributing to versatility of the memory core structure and core forming techniques of the present invention is the ability of the cores 25 to be re-formed subsequent to their initial fabrication, in the same manner as they were originally made. This may be done by liquifying the entire block 26, or selectively liquifying the portions of the block at the intersection, e.g. by electrical currents through the conductors, and programming forming currents to form the cores in different orientations. Of course, this ability to re-form cores is primarily suited to memory core matrices which are initially prepared using a dielectric medium which is heat-softenable or thermoplastic in nature. The reason for the latter requirement is that the dielectric medium must be remelted by the passage of forming currents of appropriate level through the conductors of the matrix intersecting at the desired core site 24 at which it is desired to re-form the core structure 25.

Figure 7:
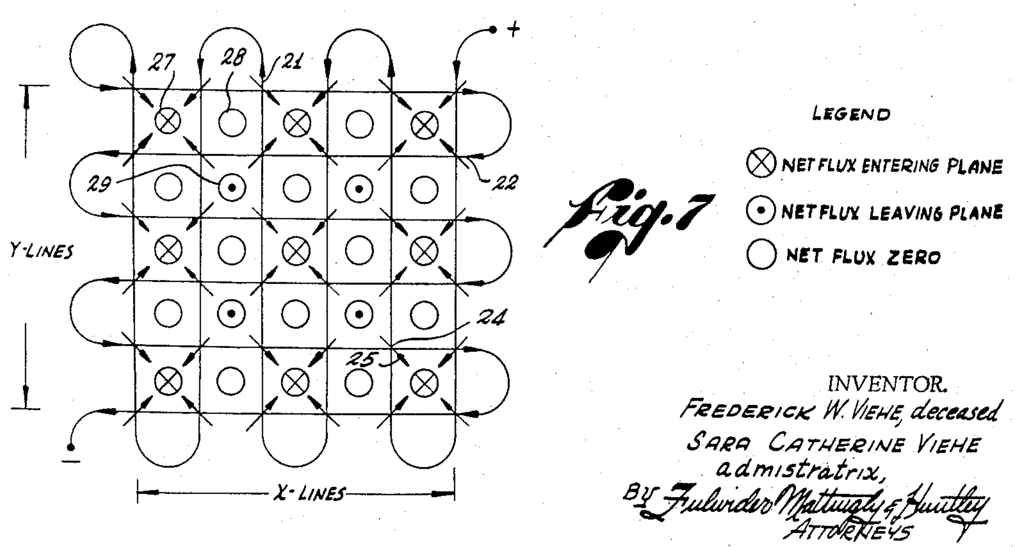
FIGURES 7, 8 and 9 are schematic diagrams of a matrix, showing examples of different ways in which currents are directed through the conductors of a matrix to produce cores formed at selected core sites, and showing the resultant net magnetic flux patterns produced.
Figure 8:
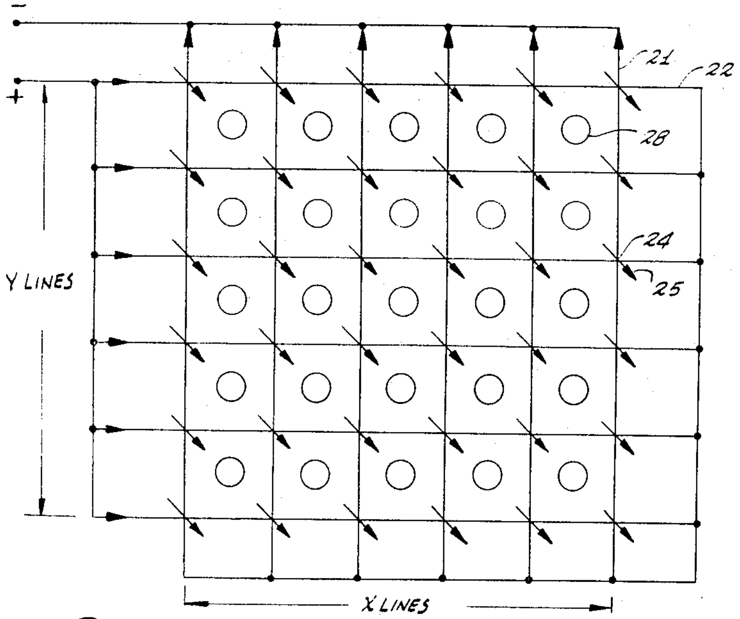
Figure 9:
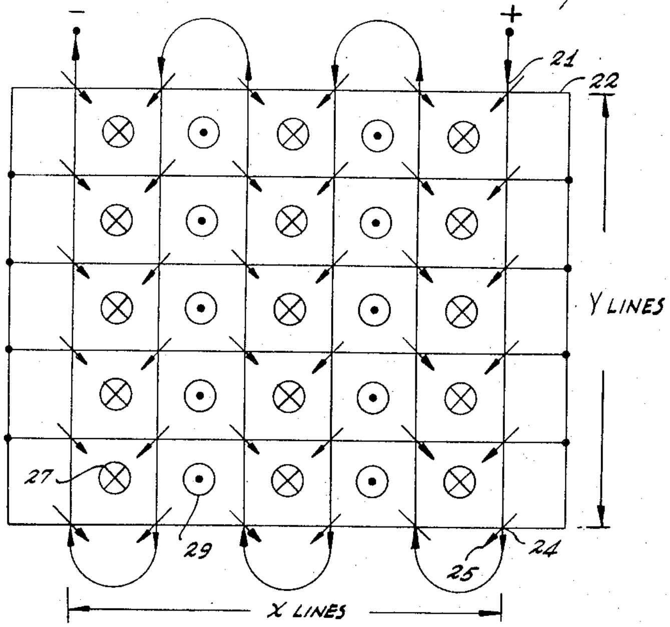

Referring now specifically to FIGURES 7, 8 and 9, the feature of the present invention whereby the individual cores 25 formed at each matrix intersection 24 may be given any desired orientation will become apparent. In this regard, the individual memory core structures 25 may be formed one at a time, in groups, or all at once. Moreover, the only requirement for forming a core 25 at a selected matrix intersection 24 is that the appropriate currents be directed through the X-line and Y-line intersecting at the selected core site 24. Hence, it is apparent that any number of cores 25 may be produced at any one time, depending upon the number of X- and Y-lines, 21 and 22, respectively, which are energized in accordance with the electrical current programming techniques previously described.

Moreover, since the orientation of the core structure 25 at any selected core site 24 will be such that the forming currents pierce the plane of the core from the same side, control of the direction of these currents serves as a useful expedient in selecting the specific orientation of any core 25 formed at any core site 24. Of course, as previously indicated, the core 25 may take the form of mere concentrations of magnetic particles about the core sites 24. In such instances, the directional orientation or distribution of the magnetic particles is controlled in the same manner as for toroidal cores.

In FIGURE 7, the X and Y-lines 21, 22, respectively, are placed in series and alternately made positive and negative. The resulting core formations are such that each of the cores 25 is oriented at right angles to each of the other cores immediately adjacent that core. The latter effect is an over-all memory core matrix configuration which provides minimum crosstalk between adjacent cores.

It will be observed, however, that the flux pattern during the forming operation of FIGURE 7 is not the same in the spaces between all cores. In this regard, some of the cores have a space between them, as indicated at 27, in which there is a very high resultant magnetic flux entering the plane. However, other cores have a similarly high resultant flux leaving the plane in the space between them, as indicated in the space 29. Still other cores have no net flux between them, as indicated in the space 28.

It should be noted that FIGURE 7 illustrates only one of a great many possible programming schemes. The specific core orientations are programmed into the matrix in accordance with the intended application of the completed device and the flux patterns which can be tolerated.

FIGURES 8 and 9 depict examples of other suitable arrangements for electrically connecting the X and Y-lines 21, 22 of the matrix to form cores 25. In FIGURE 8, all of the X and Y-lines are in parallel and the resultant cores 25 formed thereby are all oriented at the core sites 24 in the same direction and are parallel to one another, the net flux in the spaces 28 between the X and Y-lines being zero. In FIGURE 9, the Y-lines 22 are in parallel, whereas the X-lines 21 alternate in polarity in the same manner as shown in FIGURE 7. The directional arrows at the intersections indicate the directions in which the particles are aligned.

Figure 10:
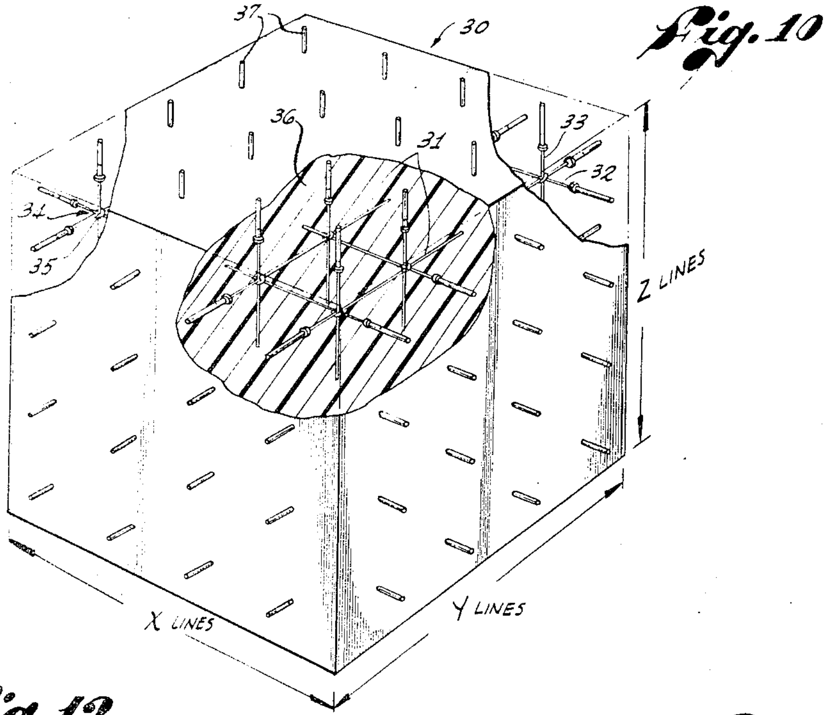
FIGURE 10 is a perspective view, partially in section, of a three-dimensional memory core matrix produced in accordance with present invention.

Referring now to FIGURE 10 of the drawings, there is shown a completed three-dimensional memory core matrix 30, formed in accordance with the instant invention. The matrix 30 is basically similar to the matrix 20 shown in FIGURE 1 and the core structures are formed in essentially the same manner, the basic differences residing primarily in the process for assembling the conductor matrix, which forms no part of the instant invention, and the addition of a third dimension to the conductor array.

The magnetic memory core matrix 30 is shown to comprise a plurality of spaced, parallel X- and Y-line planes, each of which possesses a plurality of spaced, parallel X-lines 31, and a plurality of similar Y-lines 32. A similar set of Z-lines 33, perpendicular to the X and Y-line planes, are also provided. The ends of the X, Y, and Z-lines terminate in suitable contact pins 37. The X-lines 31, Y-lines 32, and Z-lines 33 are shown as, but not limited to, mutually perpendicular configurations. These conductors 31, 32, 33 intersect in each X, Y and Z plane, as indicated at 34, and cores 35 surround all three conductors at these intersections. The dielectric medium 36, in which the entire memory core matrix is contained, constitutes the physical counterpart of the dielectric medium 26 illustrated in FIGURE 1, the characteristics of which have already been previously discussed.

Figure 11:
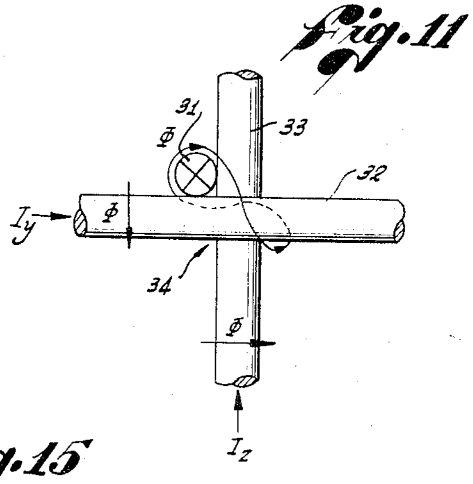
FIGURE 11 illustrates a typical three-conductor intersection in the matrix of FIGURE 10, prior to actual core formation, and illustrates the pattern of the net core-forming magnetic flux for specific current directions through the intersecting conductors.

Referring to FIGURE 11, a typical three-conductor matrix intersection for the X, Y, and Z-lines 31, 32, 33, respectively, is shown. The specific magnetic flux orientations $\phi$ about each of the conductors 31, 32, 33 for assigned current directions is illustrated, as well as the net core forming flux pattern 39 which girdles the three-conductor intersection 34. The particles of magnetic material which are ultimately drawn to the intersection 34, during the core forming process, will align essentially in accordance with the configuration dictated by the net flux pattern 39.

FIGURE 12 is a perspective view of a typical matrix intersection 34, such as that shown in FIGURES 10 and 11. In forming a core at a three-wire intersection, certain factors are present that do not exist in two-wire intersections. Since the conductors 31, 32, 33 are not, in practice, infinitesimally small, but are actually finite in size, the three conductors 31, 32, 33 are not tangent at a single point, nor do they truly intersect at a single point 34. In this regard, they actually become tangent and intersect in pairs, *xy*, *yz*, *xz*. The result is a hole 38, essentially triangular in shape, which is bounded by a short section of each of the three conductors 31, 32, 33, intersecting at the core site region 34.

The triangular-type hole 38 is schematically depicted in FIGURES 13 and 14. If the currents in each of the X, Y and Z-lines at the intersection are all in directions causing the current vectors to rotate in the same direction about the triangle 38, three units of magnetic force, indicated as $3\phi$, pass through the hole 38, as shown in FIGURE 13. The latter magnetic flux pattern would tend to form individual core girdles about each of the three intersecting conductors 31, 32, 33. This tendency does not exist if one of the current vectors is reversed in direction (see FIGURE 14); in this case, only one unit of net magnetic force, $1\phi$, passses through the center of the triangle 38.

If the three currents in the X, Y and Z-lines are in the same direction about the triangle 38, the core path appears to be more favorable and symmetrical about the intersecting conductors. Moreover, it can be demonstrated empirically that when one of the current vectors is reversed, as shown in FIGURE 14, the preference for core formation at the conductor intersection 34 drops significantly. Therefore, it is desirable to maintain the core forming symmetry about three-dimensional conductor intersections 34 and yet eliminate the problem posed by the net magnetic flux distribution shown in FIGURE 13.

In accordance with the present invention, the latter is accomplished by plugging the triangular hole 38 with a capillary bead 40, shown in FIGURE 15, the bead 40 being applied to the matrix by capillary techniques previously described. The bead 40 at each core site 34 is hardened, prior to subjecting the conductor matrix to normal core forming techniques previously described.

The improved magnetic memory core systems, such as the two-dimensional matrix 20 shown in FIGURE 1 and the three-dimensional matrix 30 shown in FIGURE 10, provide extremely economical and easily fabricated memory devices which eliminate the manual assembly difficulties which have so long plagued the manufacture of such devices. Moreover, the core structures within the memory system may be selectively and automatically formed either individually, in groups, or all simultaneously and in any desired orientation. Furthermore, the extremely small core size attainable by the core formation techniques of the present invention enable memory systems of greater capacity and minimal volume requirements to be produced.

It will be apparent that in view of the various embodiments of the structures and methods of the invention herein shown and described, various modifications may be made without departing from the spirit and scope of the invention. Therefore, it is intended that the invention shall not be limited, except as by the appended claims.

What is claimed is:

1. A memory core matrix comprising: a multi-dimensional array of intersecting electrical conductors; a plurality of core structures of finely divided magnetic material, one core structure surrounding each of said conductor intersections; and means structurally supporting said array and securing said core structures in place, said means including an element of potting material in which said conductors and core structures are embedded.

2. An array of memory core structures comprising: a matrix of intersecting electrical conductors; a plurality of cores of core forming magnetic material, respective ones encircling each conductor at selected intersections; and a heat-softenable dielectric medium housing said conductors and said cores, said dielectric medium also containing additional core forming magnetic material dispersed throughout said medium.

3. A re-formable memory core matrix comprising: an array of intersecting electrical conductors; a core of finely divided magnetic material encircling each conductor at each intersection; and a heat-softenable element in which said conductors and said cores are embedded, the material of said element being characterized in that it melts upon electrical currents of predetermined magnitudes being passed through said conductors, whereby said magnetic material is made mobile to respond to said currents to assume core forms differently oriented about the intersections than said first-mentioned cores.

4. A memory device comprising in combination: a three-dimensional array of mutally perpendicular intersecting conductors, each intersection region having a hole bounded on three sides by the surfaces of said intersecting conductors; a hardened bead of non-heat-softenable material at each conductor intersection and filling said hole at each intersection; a magnetic core structure encircling each of a plurality of said conductor intersections; and a heat-softenable dielectric medium containing said conductors, said beads and said core structures.

5. A device as set forth in claim 4 wherein said hardened beads are of thermosetting plastic material and said dielectric medium comprises a thermoplastic material.

References Cited

UNITED STATES PATENTS

| | | | |
|---|---|---|---|
| 2,784,391 | 3/1957 | Rajchman et al. ---- | 340—174 |
| 2,934,748 | 4/1960 | Steimen ------------ | 340—174 |
| 3,245,058 | 4/1966 | Bruce ------------- | 340—174 |

BERNARD KONICK, *Primary Examiner.*

S. M. URYNOWICZ, *Assistant Examiner.*